United States Patent [19]

Lesko

[11] 4,455,510

[45] Jun. 19, 1984

[54] HIGH INTENSITY DISCHARGE BALLAST WITH HOT RESTRIKE PERFORMANCE

[75] Inventor: Robert J. Lesko, Newton, N.J.

[73] Assignee: HID Systems, Inc., Sparta, N.J.

[21] Appl. No.: 380,463

[22] Filed: May 20, 1982

[51] Int. Cl.³ .......................................... H05B 41/22
[52] U.S. Cl. ..................................... 315/263; 315/117; 315/204; 315/284; 315/308; 315/360; 315/DIG. 7
[58] Field of Search ......... 315/289, 290, 307, DIG. 2, 315/DIG. 5, DIG. 7, 244, 360, 362, 112, 117, 204, 263, 284, 308

[56] References Cited

U.S. PATENT DOCUMENTS

| | | | |
|---|---|---|---|
| 3,931,544 | 1/1976 | Pitel | 315/DIG. 7 |
| 3,944,876 | 3/1976 | Helmuth | 315/289 X |
| 4,107,579 | 8/1978 | Bodine, Jr. et al. | 315/DIG. 5 |
| 4,283,658 | 8/1981 | Parker | 315/307 |
| 4,356,433 | 10/1982 | Linden | 315/DIG. 7 |

Primary Examiner—Eugene R. LaRoche
Attorney, Agent, or Firm—Anthony D. Cipollone

[57] ABSTRACT

A high intensity discharge ballast that provides instant restrike of hot high intensity lamps, rapid warm-up and normal ballasting functions so as to circumvent the deficiencies of heating and cooling cycles in high intensity discharge lamps which cycles are unacceptable in special applications such as graphic arts and stadium lighting.

3 Claims, 4 Drawing Figures

SIMPLIFIED DIAGRAM OF HIGH-INTENSITY DISCHARGE BALLAST

FIGURE-2 — HOT RESTRIKE PHENOMENA

FIGURE-3 — LAMP CHARACTERISTICS DURING RAPID WARM-UP

HIGH INTENSITY DISCHARGE BALLAST WITH HOT RESTRIKE PERFORMANCE

BACKGROUND OF THE INVENTION

The present invention relates to a high intensity discharge ballast providing instant restrike of hot high intensity lamps, rapid warm-up and normal ballasting functions.

High intensity discharge (HID) lamps are used in many applications because of their long life and high efficiency for converting electrical energy to light. Unlike incandescent lamps, HID lamps have negative resistance properties and require a ballast to limit their current. Furthermore, these lamps take two to three minutes to reach normal operating temperatures and when extinguished, they take two to five minutes to cool before restarting. In most applications, the time delay during the heating and cooling cycle are acceptable but not desireable. In special applications, such as graphic arts and stadium lighting, for example, the heating and cooling cycles are unacceptable which necessitates better ballast performance to circumvent these deficiencies.

U.S. Pat. No. 3,944,876 issued to James G. Helmuth Mar. 16, 1976 describes Rapid Starting of Gas Discharge Lamps. The invention relates to overcoming problems in starting gas discharge lamps. The two long standing problems addressed by this invention are the objectionable long warm-up times, up to five minutes in certain cases and the practical impossibility of re-starting a warmed up mercury vapor lamp until it cools. For repetitive on or off duty, it has been the practise to leave the lamp on all the time and resort to a mechanical shutter which is moved to control exposure. Such shutters however, are the cause of two major problems: (1) they are subject to mechanical failure; (2) the resultant prolonged exposure to a mercury vapor lamp in the On condition can cause serious damage to the eyes and skin.

To overcome the above problems, the Helmuth invention resorts to the use of a starting device which comprises means to apply to the lamp one or more transient voltage plates which initially change in amplitude in a polarity direction relatively in opposition to the polarity of the main voltage simultaneously supplied to the electrodes and thereafter each pulse is typically caused to change in amplitude in a polarity direction in aid of the polarity of the main voltage then being applied to the electrodes resulting in a rapid start of the lamp. The Helmuth invention further provides circuitry to achieve the above. An additional object of the Helmuth invention is to provide effective ballast circuitry between the main AC source and the lamp shortening the time from start to full light out, without drawing excessive current from the mains and without applying excessive power to the lamp.

U.S. Pat. No. 3,931,544 issued on Jan. 6, 1976 to Ira Jay Pitel relates to Fast Warm Up Electronic Ballast Circuit For A High Pressure Discharge Lamp. This invention describes an electronic ballast circuit for effecting a relatively rapid activation of an HID lamp.

OBJECTS AND SUMMARY OF THE INVENTION

Briefly, the invention relates to a HIGH INTENSITY DISCHARGE BALLAST providing instant restrike of hot high intensity discharge lamps, rapid warm-up and normal ballasting functions.

HIGH INTENSITY DISCHARGE (HID) lamps are used in many applications because of their long life and high efficiency for converting electrical energy to light. Unlike incandescent lamps, HID have negative resistance properties and require a ballast to limit their current. Furthermore, these lamps take two to three minutes to reach normal operating temperatures and when extinguished take two to five minutes to cool before they can be restarted.

In most applications the time delays during the heating and cooling cycles are not desireable, but acceptable. In special applications, such as graphic arts and stadium lighting, the heating and cooling cycles are inacceptable which necessitates better ballast performance to circumvent these deficiencies.

Accordingly, it is the object of this invention to provide improved HID ballast circuitry for effecting substantial reduction in warm-up time of HID lamps as opposed to previous inventions. The circuitry of the present invention provides a capacitive discharge network that produces initial breakdown, hot spot formation and full arc to hot HID lamps. Furthermore, this network, unlike prior ballast circuits, operates during half the period of the ballast's input voltage, a factor directly related to parts count and cost.

Another object of this invention is the safety circuit that inhibits the high voltage pulse circuitry after a short time period thereby reducing shock hazards and potential fires if the lamp fails to start.

Still another object of this invention is a simple lamp detection scheme that controls instant restart and fast warm-up features.

Still another object of this invention is the maintenance of the lamp at a fixed temperature by the use of a fan control circuit connected in series with a solid state relay controlled by the lamp circuitry.

DETAILED DESCRIPTION OF THE DRAWINGS

Figure 1:
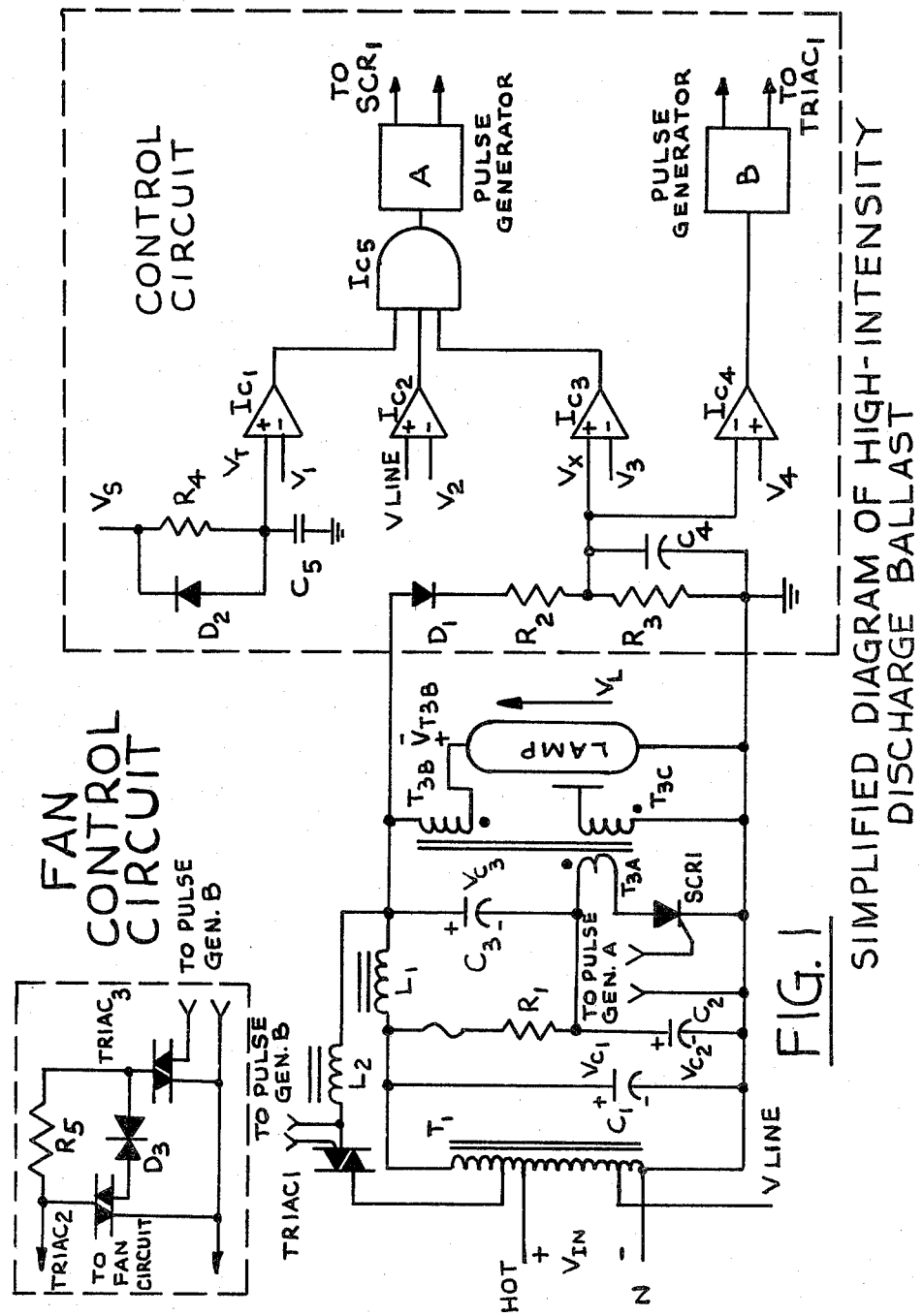
FIG. 1 is a simplified schematic diagram of the HIGH INTENSITY DISCHARGE BALLAST with fan control circuit.

Referring to FIG. 1, a simplified schematic diagram of the HID ballast, power is applied to the input terminals of $T_1$ and the voltage across the lamp $V_L$, is detected by $D_1$, $R_2$, $R_3$, and $C_4$ producing a voltage, $V_x$.

The lamp initially appears as an open circuit causing $V_x$ to be greater than $V_3$. If the conditions also exist such that the line voltage, $V_{line}$, is greater than reference $V_2$, and the timer voltage, $V_t$ is greater than reference $V_1$, the Pulse Generator A is enabled causing $SCR_1$ to be triggered at designated time instants.

$SCR_1$ discharge capacitor $C_2$ through the primary of $T_3$, $T_{3A}$. $C_2$ and the magnetization inductance of $T_{3A}$ form a resonant circuit which produces 20 KV peak underdamped transient voltages across the secondary windings of $T_{3B}$ and $T_{3C}$. These voltages cause initial breakdown of the lamp.

Figure 2:
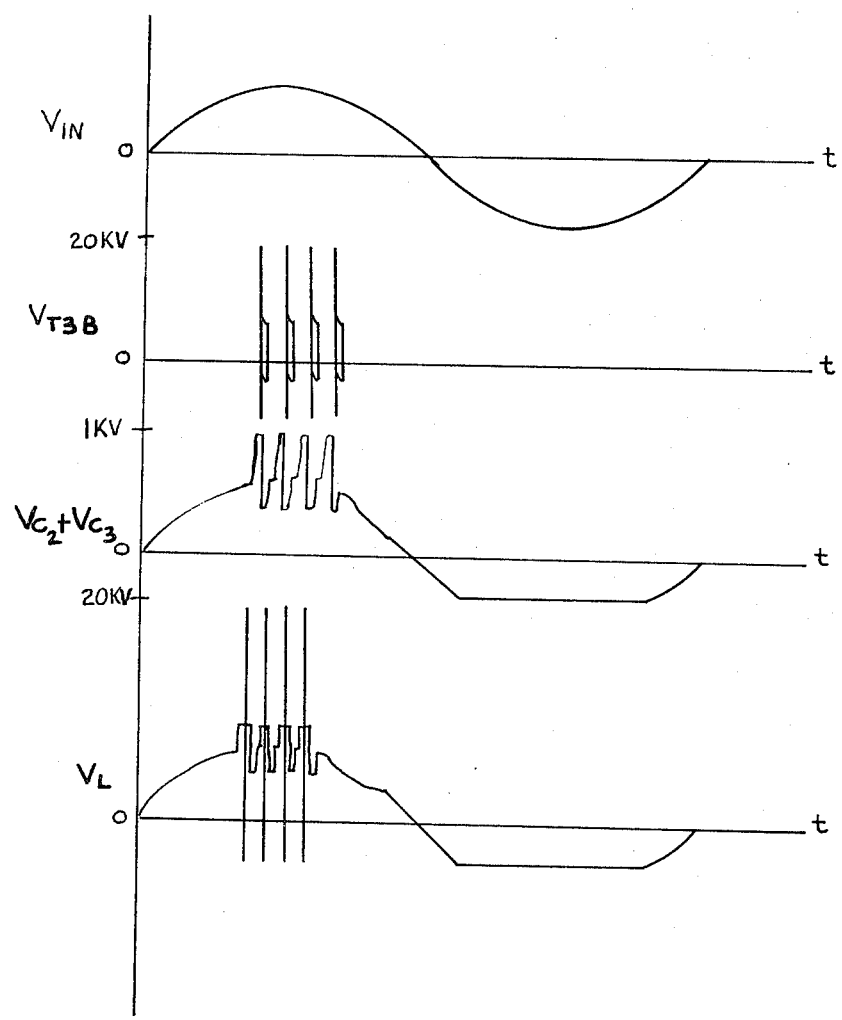
FIG. 2 is a graphic representation of the hot restrike phenomena.

To form a hot spot, approximately 1000 volts is required. This is produced by the resonant circuit of $L_1$, $C_3$ and $C_2$ as illustrated in FIG. 2. Capacitor $C_2$ is charged via $R_1$ and discharged several times to insure the hot spot formation during the half cycle.

As the lamp begins to draw a full arc, $V_L$ drops to approximately 20 volts. Lamp current initially flows through $R_1$ and $C_3$ until steady-state ballasting conditions are reached. Afterwards, the dominant part of the lamp current flows through $L_1$.

When the lamp voltage drops, $V_x$ falls below $V_3$ and pulse Generator A is disabled. Furthermore, if a time period of five seconds elapses and the lamp does not ignite or if the lamps fails, Pulse Generator A is again disabled, protecting the user from potential shocks or fires. $D_2$, $R_4$, $C_5$ and $IC_1$ form a five second timer providing this feature.

Figure 3:
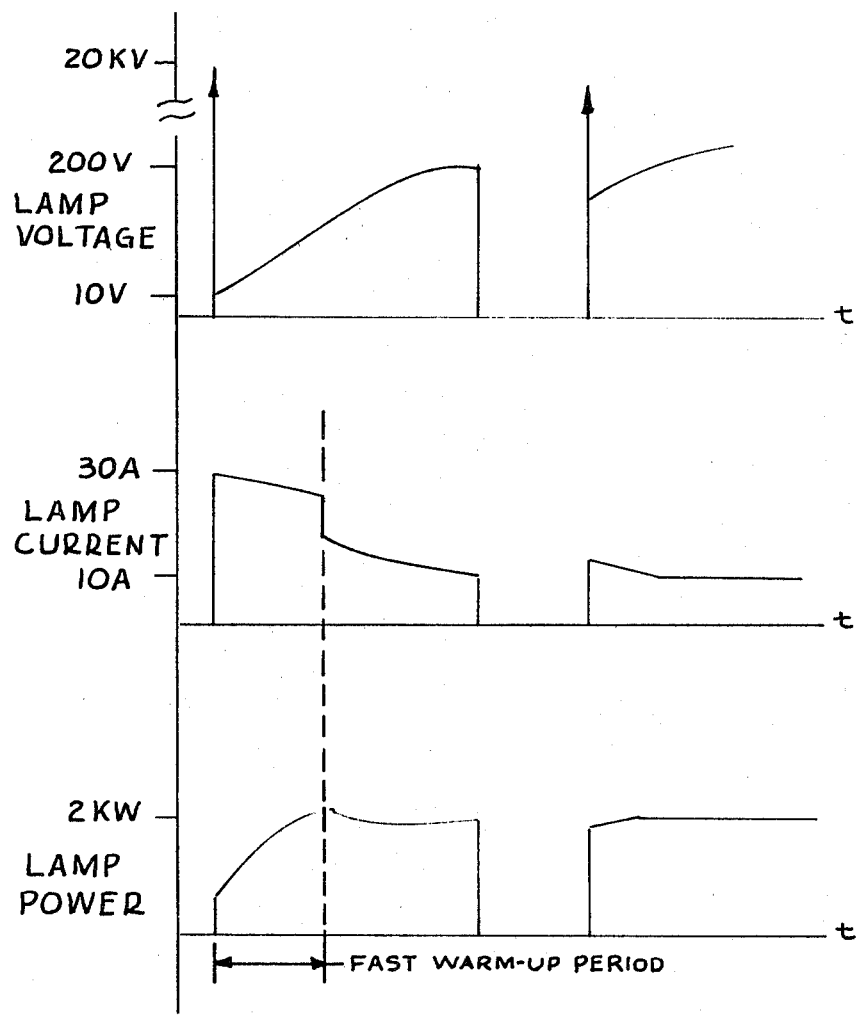
FIG. 3 is a graphic representation of lamp characteristics during rapid warm-up.

To initiate fast warm-up, $V_x$ must fall below reference $V_4$. This enables Pulse Generator B which triggers $TRIAC_1$ connecting $L_2$ to a low voltage tap of $T_1$. During the conducting state of $TRIAC_1$, current flows through both $L_1$ and $L_2$. As illustrated in FIG. 3, fast warm-up ends when $V_x$ reaches reference $V_4$. At this instant, Pulse Generator B is disabled and normal ballasting commences.

The fan control circuit as illustrated in FIG. 1 is connected in series to a solid state relay forming part of the lamp circuitry. When the lamp is cool and power is applied, pulse generator B causes $TRIAC_3$ to conduct inhibiting $TRIAC_2$ from conducting. During this mode the fan circuit is disabled, decreasing warm-up time. When fast warm-up ceases, $TRIAC_3$ opens causing $TRIAC_2$ to conduct and the fan to operate. This method is used to maintain a constant lamp temperature once fast warm-up has been accomplished.

Figure 4:
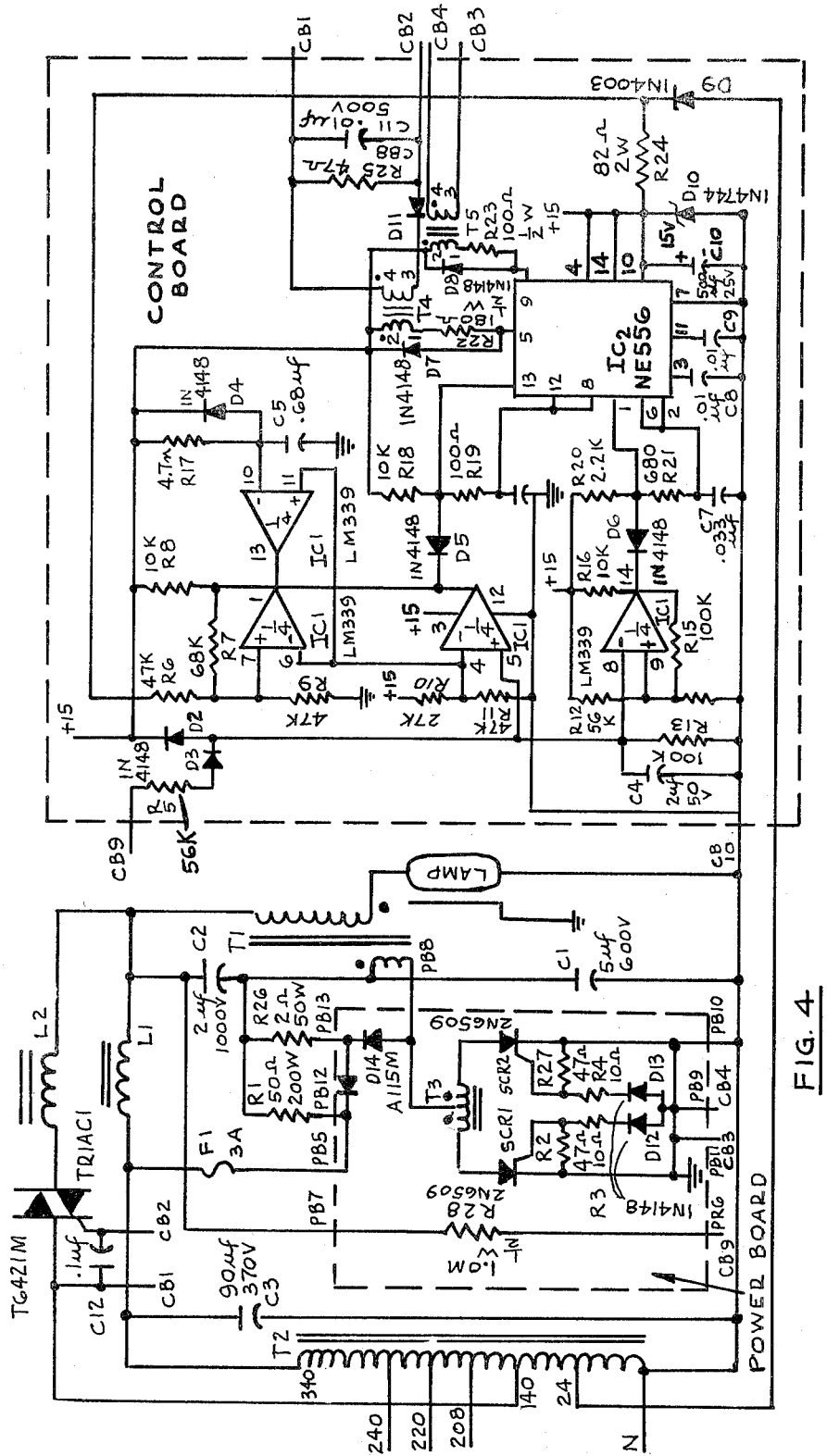
FIG. 4 shows detailed schematic diagram of HID ballast basically the same as FIG. 1 except for necessary circuit detail for practical application.

FIG. 4 shows a detailed schematic of the HID ballast. The topology is basically the same as FIG. 1 except for some circuit details necessary for practical application.

What is claimed is:

1. A ballast circuit for a High Intensity Discharge (HID) Lamp, comprising:
    voltage source means for supplying voltage to the electrodes of the high intensity discharge lamp;
    means for detecting the voltage across the electrodes;
    a first pulse generator;
    control circuit means responsive to said voltage detection means for controlling said first pulse generator;
    a silicon controlled rectifier (SCR) driven by said first pulse generator at a predetermined rate;
    a first plurality of electrical components including diodes, capacitors, resistances, transformers and inductors operatively associated with each other; certain ones of said first plurality of electrical components connected to form a first resonant circuit and operatively connected in series with said SCR to fire the discharge lamp, said first plurality of components activated by said SCR, whereby said first resonant circuit produces transient voltages to cause the initial breakdown of said HID lamp in response to the output of said first pulse generator;
    certain ones of said first plurality of electrical components operatively associated with each other to form a second resonant circuit, said second resonant circuit connected in circuit with and activated by said SCR, whereby sufficient voltage is supplied to said HID Lamp to form a hot spot in said HID lamp;
    said control circuit means including first comparator circuit means for comparing the voltage detected across the electrodes to a first reference voltage ($V_3$), whereby when said detected voltage falls below said first reference voltage, said control circuit means deactivates said SCR through said first pulse generator; said control circuit means further including a second plurality of electrical components including diodes, capacitors, resistances operatively connected to each other to form a timing circuit, and a second comparator circuit means, the input of said second comparator circuit means operatively connected to said timing circuit and a second reference voltage ($V_1$), the output of said second comparator circuit means connected through said first pulse generator to said SCR, whereby if after turn on the lamp does not ignite, or fails, after a predetermined time interval measured by said timing circuit, said SCR is deactivated, said control circuit means further comprising third comparator circuit means for comparing a first voltage proportional to the line voltage, to a third reference voltage ($V_2$), the output of said third comparator circuit means connected through said first pulse generator to said SCR, said SCR deactivated when said first voltage is below said third reference voltage, indicating a low line voltage;
    a second pulse generator;
    fourth comparator circuit means operatively connected to said voltage detection means and a fourth reference voltage, said second pulse generator activated by the output of said fourth comparator means when said detected electrode voltage falls below said fourth reference voltage;
    an inductor, ($L_2$), and
    a first triac operatively connected to said voltage source means and to said lamp through said inductor, ($L_2$), said triac driven by said second pulse generator, whereby fast warm up current flows through said triac and said inductor ($L_2$) to said lamp until said detected electrode voltage reaches said fourth reference voltage.

2. The circuit claimed in claim 1 further comprising: wherein said first plurality of electrical components includes fan circuit drive means operatively connected to a voltage source and said second pulse generator, and,
    a second triac driven by said second pulse generator, said second triac operatively connected to said fan circuit drive means; and
    a fan for normally cooling the HID lamp, said fan driven by said fan circuit drive means,
    whereby said fan circuit drive means is inhibited by the action of said second triac when said second pulse generator is activated.

3. A ballast circuit for a High Intensity Discharge (HID) Lamp, comprising:
    voltage source means for supplying voltage to the electrodes of the high intensity discharge lamp;
    means for detecting the voltage across the electrodes;
    a first pulse generator;
    control circuit means responsive to said voltage detection means for controlling said first pulse generator;

a silicon controlled rectifier (SCR) driven by said first pulse generator at a predetermined rate;

a first plurality of electrical components including diodes, capacitors, resistances, transformers and inductors operatively associated with each other, certain ones of said first plurality of electrical components connected to form a first resonant circuit and operatively connected in series with said SCR to fire the discharge lamp, said first plurality of components activated by said SCR, whereby said first resonant circuit produces transient voltages to cause the initial breakdown of said HID lamp in response to the output of said first pulse generator; certain ones of said first plurality of electrical components operatively associated with each other to form a second resonant circuit, said second resonant circuit connected in circuit with and activated by said SCR, whereby sufficient voltage is supplied to said HID Lamp to form a hot spot in said HID Lamp;

said control circuit means including first comparator circuit means for comparing the voltage detected across the electrodes to a first reference voltage ($V_3$), whereby when said detected voltage falls below said first reference voltage, said control circuit means deactivates said SCR through said first pulse generator; said control circuit means further including a second plurality of electrical components including diodes, capacitors, resistances operatively connected to each other to form a timing circuit, and a second comparator circuit means, the input of said second comparator circuit means operatively connected to said timing circuit and a second reference voltage ($V_1$), the output of said second comparator circuit means connected through said first pulse generator to said SCR, whereby if after turn on the lamp does not ignite, or fails, after a predetermined time interval measured by said timing circuit, said SCR is deactivated, said control circuit means further comprising third comparator circuit means for comparing a first voltage proportional to the line voltage, to a third reference voltage ($V_2$), the output of said third comparator circuit means connected through said first pulse generator to said SCR, said SCR deactivated when said first voltage is below said third reference voltage, indicating a low line voltage;

a second pulse generator;

fourth comparator circuit means operatively connected to said voltage detection means and a fourth reference voltage, said second pulse generator activated by the output of said fourth comparator means when said detected electrode voltage falls below said fourth reference voltage;

an inductor, ($L_2$), a first triac operatively connected to said voltage source means and to said lamp through said inductor, ($L_2$), said triac driven by said second pulse generator, whereby fast warm up current flows through said triac and said inductor ($L_2$) to said lamp until said detected electrode voltage reaches said fourth reference voltage;

said first plurality of electrical components including a fan circuit drive means operatively connected to a voltage source and said second pulse generator, a second triac driven by said second pulse generator, said second triac operatively connected to said fan circuit drive means; and a fan for normally cooling the HID lamp, said fan driven by said fan circuit drive means, whereby said fan circuit drive means is inhibited by the action of said second triac when said second pulse generator is activated.

* * * * *